(12) United States Patent
Tsunoda

(10) Patent No.: US 7,049,019 B2
(45) Date of Patent: May 23, 2006

(54) FUEL CELL

(75) Inventor: Tadashi Tsunoda, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 243 days.

(21) Appl. No.: 10/652,748

(22) Filed: Aug. 28, 2003

(65) Prior Publication Data

US 2004/0043270 A1    Mar. 4, 2004

(30) Foreign Application Priority Data

Aug. 28, 2002  (JP)  ............................. 2002-249382
May 13, 2003  (JP)  ............................. 2003-134215

(51) Int. Cl.
*H01M 2/00* (2006.01)
*H01M 2/14* (2006.01)

(52) U.S. Cl. ........................... 429/32; 429/34; 429/35; 429/38; 429/39

(58) Field of Classification Search .................. 429/32, 429/34, 35, 38, 39
See application file for complete search history.

(56) References Cited

U.S. PATENT DOCUMENTS 6,569,554 B1 *  5/2003  Doggwiler et al. ........... 429/26

FOREIGN PATENT DOCUMENTS

| CA | 2 422 926 | | 3/2003 |
| CA | 2422926 A1 | * | 3/2003 |
| EP | 0 355 420 A1 | | 2/1990 |
| EP | 0951086 A2 | * | 10/1999 |
| EP | 1 075 033 A1 | | 6/2000 |
| JP | 04026068 A | | 1/1992 |
| JP | 06310164 A | | 11/1994 |
| JP | 08279364 A | | 10/1996 |
| JP | 11-16581 | * | 1/1999 |
| WO | WO-02/25765 A2 | | 3/2002 |
| WO | WO-02/25765 A3 | | 3/2002 |

* cited by examiner

*Primary Examiner*—Patrick Joseph Ryan
*Assistant Examiner*—Angela J. Martin
(74) *Attorney, Agent, or Firm*—Lahive & Cockfield, LLP; Anthony A. Laurentano, Esq.

(57) ABSTRACT

Each of separators for sandwiching a plurality of electrolyte electrode assemblies includes a pair of plates. A fuel gas channel and an oxygen-containing gas channel are formed between the plates. First and second circumferential ridges are formed integrally on curved outer sections of the plates to protrude away from each other. Further, outer projections and inner projections are formed integrally on opposite sides of the first and second circumferential ridges to protrude toward each other.

5 Claims, 17 Drawing Sheets

← OXYGEN-CONTAINING GAS
←--- FUEL GAS

←---- FUEL GAS

FUEL CELL

BACKGROUND OF THE INVENTION

1. Field of the Invention

The present invention relates to a fuel cell having a plurality of electrolyte electrode assemblies interposed between separators. Each of the electrolyte electrode assemblies includes an anode, and a cathode, and an electrolyte interposed between the anode and the cathode.

2. Description of the Related Art:

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates), and the electrolyte electrode assembly and the separators make up a unit of fuel cell for generating electricity. A predetermined number of fuel cells are stacked together to form a fuel cell stack.

In the fuel cell, an oxygen-containing gas or air is supplied to the cathode The oxygen in the oxygen-containing gas is ionized at the interface between the cathode and the electrolyte, and the oxygen ions ($O^{2-}$) move toward the anode through the electrolyte. A fuel gas such as hydrogen-containing gas or CO is supplied to the anode. Oxygen ions react with the hydrogen in the hydrogen-containing gas to produce $H_2O$ or react with CO to produce $CO_2$. Electrons released in the reaction flow through an external circuit to the cathode, creating a DC electric current.

Generally, the solid oxide fuel cell is operated at a high temperature in the range from 800° C. to 1000° C. The solid oxide fuel cell utilizes the high temperature waste heat for internal reforming to produce the fuel gas, and generates electricity by spinning a gas turbine. The solid oxide fuel cell is attractive as it has the highest efficiency in generating electricity in comparison with other types of fuel cells, and receiving growing attention for potential use in vehicles in addition to the applications in combination with the gas turbine.

Stabilized zironia has a low ion conductivity. Therefore, the electrolyte membrane formed of stabilized zirconia needs to be thin so that oxygen ions move through the electrolyte membrane smoothly for improving the power generation performance. However, the electrolyte membrane of the stabilized zirconia can not be very thin for maintaining the sufficient mechanical strength. Therefore, it is difficult to produce a large electricity using the membrane of stabilized zirconia in the solid oxide fuel cell.

In an attempt to address the problem, Japanese Laid-Open Patent Publication No. 6-310164 (prior art 1) discloses a solid oxide fuel cell system. In the solid oxide fuel cell system, a plurality of unit cells each having a small surface area are provided on each of metallic separators, and a fuel gas supply hole and an oxygen-containing gas supply hole are formed centrally in each of the unit cells. The prior art 1 is directed to provide a fuel cell system having an improved reliability in which the total surface area of the cells on the separator is large, and the substrate is crack-free.

In the prior art 1, the cells are interposed between the thin separators, and the separators and the cells are stacked alternately to form a fuel cell stack. Therefore, the rigidity of the separators is low. Since a substantial space corresponding to the thickness of the cells is formed between outer circumferential regions of the separators, the outer circumferential regions of the separators may be deformed, and thus, gas leakage may occur. Therefore, the desired power generation performance may not be maintained.

Further, Japanese Laid-Open Patent Publication No. 4-26068 (prior art 2) discloses another type of fuel cell system. As shown in FIG. 17, in the fuel cell system, a unit cell 1 is interposed between a pair of separators 2. Each of the separators 2 includes a pair of metallic thin plates 3, 4. The plates 3, 4 are joined together with a marginal plate 5 interposed between the plates 3, 4. The marginal plate 5 shields the outer circumferential area between the plates 3, 4. A gas channel 7 is formed in an inner area 6 between the plates 3, 4. The plate 4 has small through holes 8 for supplying a fuel gas to the anode or an oxygen-containing gas to the cathode.

In the fuel cell system, the small holes 8 are formed on the plate 4 of the separator 2. The plate 4 having a flat surface is in contact with the unit cell 1 without any space between the plate 4 and the unit cell 1. Therefore, the pressure between the separator 1 and the unit cell 1 is uniform. Namely, the pressure is uniformly applied to the entire surface of the unit cell 1.

However, in the prior art 2, a gap 9 is formed between outer circumferential regions of the separators 2. Therefore, when the fuel cell stack is tightened by a bolt, for example, the pressure may not be uniformly applied to the entire surface of the separators 2. Thus, the fuel cell stack may be deformed undesirably. Consequently, the pressure is not applied to the entire surface of the unit cell 1. If the unit cell 1 is damaged, gas leakage may occur due to the sealing failure.

SUMMARY OF THE INVENTION

A main object of the present invention is to provide a fuel cell including a plurality of electrolyte electrode assemblies with a compact and simple structure, in which an oxygen-containing gas is reliably supplied to the fuel cell, and the pressure is uniformly applied to electrode surfaces.

According to the present invention, each of separators for sandwiching electrolyte electrode assemblies includes a first plate and a second plate stacked together.

A fuel gas channel for supplying a fuel gas to anodes of the electrolyte electrode assemblies, and an oxygen-containing gas channel for supplying an oxygen-containing gas to cathodes of the electrolyte electrode assemblies are formed between the first and second plates.

A first ridge is formed on the first plate, and a second ridge is formed on the second plate. The first ridge and the second ridge protrude away from each other to form the oxygen-containing gas channel between the first ridge and the second ridge. The first plate includes a first outer projection and a first inner projection on opposite sides of the first ridge. The second plate includes a second outer projection and a second inner projection on opposite sides of the second ridge. The first outer projection and the first inner projection protrude oppositely to the first ridge, and the second inner projection and the second outer projection protrude oppositely to the second ridge such that the first outer projection and the second outer projection are in contact with each other, and the first inner projection and the second inner projection are in contact with each other. The first outer projection and the second outer projection are in contact with each other, and the first inner projection and the second inner projection are in contact with each other around a space of the oxygen-containing gas channel. Therefore, the rigidity of the fuel cell around the space of the oxygen-containing gas channel is good. When the separators are tightened in the stacking direction of the fuel cells, the pressure is uniformly applied to the surfaces of the electrodes, and the space of the oxygen-containing gas channel is not deformed. It is possible to supply the oxygen-containing gas to each of the electrolyte electrode assemblies uniformly, and achieve the desired power generation performance of the fuel cell. Further, the sealing characteristics between the first plate and the second plate are improved effectively.

The first ridge is formed integrally with the first plate, and extends around a curved outer section of the first plate. The second ridge is formed integrally with the second plate, and extends around a curved outer section of the second plate. The first outer projection and the first inner projection are formed integrally with the first plate. The second outer projection and the second inner projection are formed integrally with the second plate. Thus, the rigidity of the first plate and the second plate is improved desirably, and the number of steps for forming the first plate and the second plate can be reduced.

The first ridge formed on the first plate of one of the separators is in contact with the second ridge formed on the second plate of the other of the separators to form an exhaust gas channel having an end closed between the separators.

The oxygen-containing gas channel and the exhaust gas channel are formed only by the first separator and the second separator. Thus, the production of the fuel cell is simply performed. Since dedicated pipes or the like are not needed for the oxygen-containing gas channel and the exhaust gas channel, the number of components of the fuel cell is small. Further, since a space is formed between the first ridge of the first separator and the second ridge of the second separator, the heights of the first ridge and the second ridge can be small. When the first plate and the second plate are formed under pressure, the amount of drawing for each of the first ridge, the second ridge, the first and second outer projections, and the first and second inner projections is small. Therefore, the first plate and the second plate can be formed with a high degree of accuracy.

Further, a seal for sealing the oxygen-containing gas channel is formed between the first ridge formed on the first plate of one of the separators and the second ridge formed on the second plate of the other of the separators. Thus, the pressure is uniformly applied to the seal. With the simple structure, the sealing is performed reliably.

The electrolyte electrode assemblies are arranged along at least one circle around a center of the separators. Therefore, the oxygen-containing gas is supplied to the each of the electrolyte electrode assemblies, and the power generation is performed uniformly, and the size of the fuel cell is effectively reduced.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
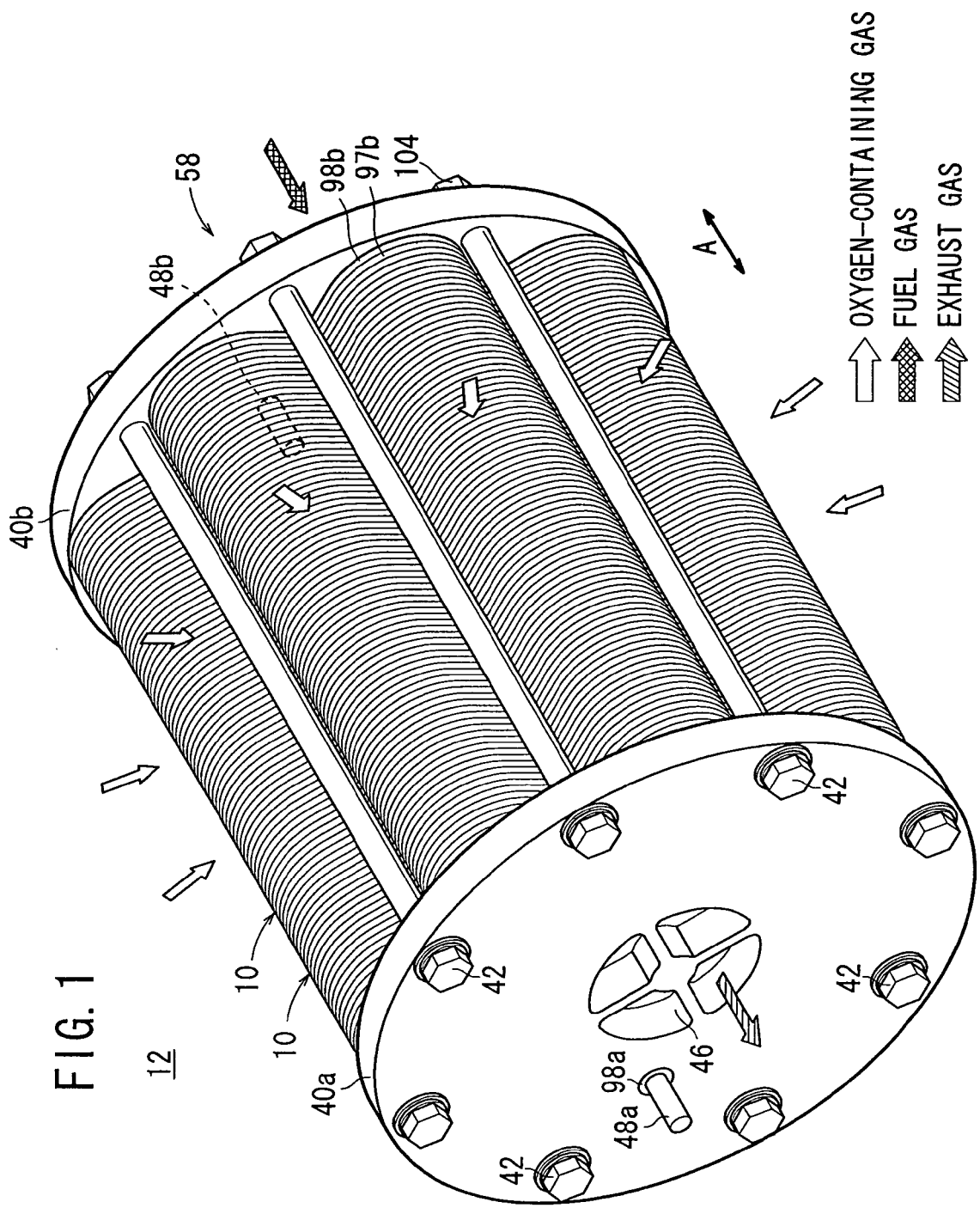
FIG. 1 is a perspective view schematically showing a fuel cell stack formed by stacking a plurality of fuel cells according to a first embodiment of the present invention.
Figure 2:
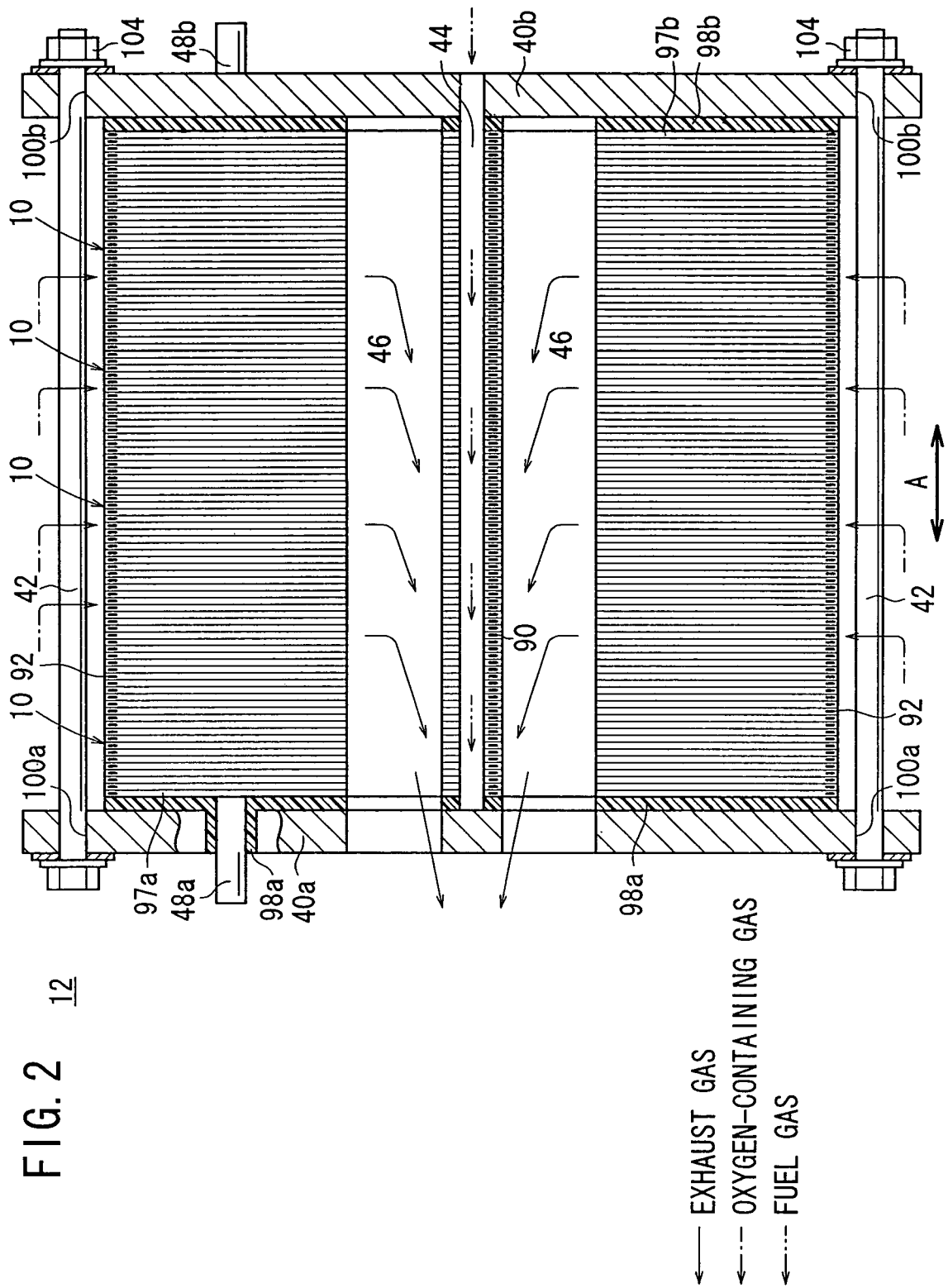
FIG. 2 is a cross sectional view showing a part of the fuel cell stack.

FIG. 1 is a perspective view schematically showing a fuel cell stack 12 formed by stacking a plurality of fuel cells 10 according to a first embodiment of the present invention, and FIG. 2 is a cross sectional view showing a part of the fuel cell stack 12.

Figure 3:
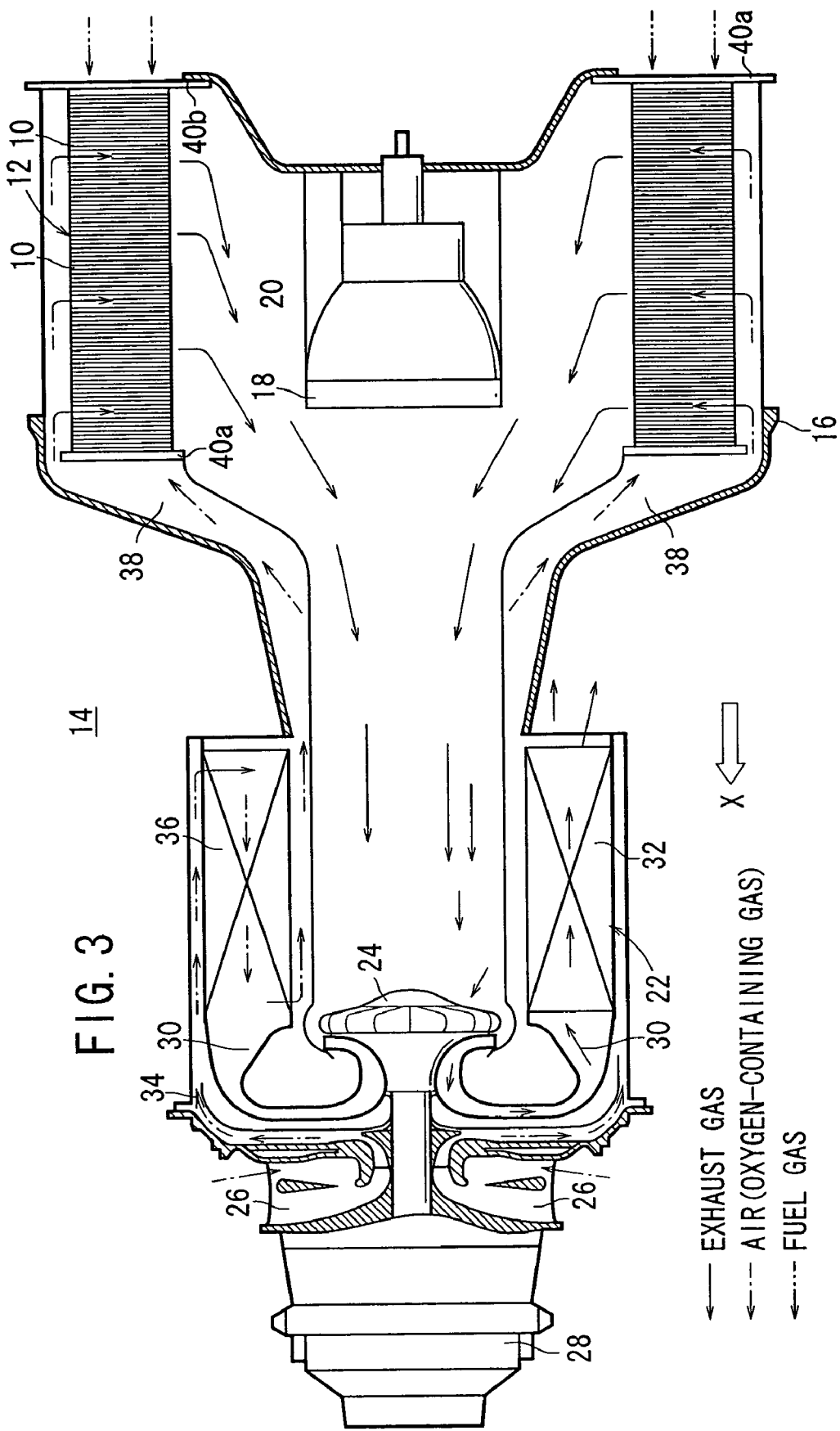
FIG. 3 is a view schematically showing a gas turbine including the fuel cell stack.

The fuel cell 10 is a solid oxide fuel cell (SOFC) for stationary and mobile applications. For example, the fuel cell 10 is mounted on vehicles. In an example of the first embodiment shown in FIG. 3, the fuel cell stack 12 is used in a gas turbine 14. In FIG. 3, the shape of the fuel cell stack 12 is different from those shown in FIGS. 1 and 2, however, the structure is substantially the same.

The fuel cell stack 12 is disposed in a casing 16 of the gas turbine 14. A combustor 18 is disposed at the center of the fuel cell stack 12. The fuel cell stack 12 discharges an exhaust gas as a mixed gas of a fuel gas and an oxygen-containing gas after reaction into a chamber 20 toward the combustor 18. The chamber 20 is narrowed in a flow direction of the exhaust gas indicated by an arrow X. A heat exchanger 22 is externally provided around the chamber 20 at a forward end in the flow direction. Further, a turbine (power turbine) 24 is disposed at the forward end of the chamber 20. A compressor 26 and a power generator 28 are coaxially connected to the turbine 24. The gas turbine 14 has an axially symmetrical structure as a whole.

A discharge passage 30 of the turbine 24 is connected to a first passage 32 of the heat exchanger 22. A supply passage 34 of the compressor 26 is connected to a second passage 36 of the heat exchanger 22. The air is supplied to the outer circumferential surface of the fuel cell stack 12 through a hot air inlet passage 38 connected to the second passage 36.

As shown in FIG. 1, the fuel cell stack 12 is formed by stacking a plurality of fuel cells 10 in a stacking direction indicated by an arrow A. Each of the fuel cells 10 has a shape of a disk having a curved outer section. Flanges 40a, 40b are provided outside the outermost fuel cells 10 at opposite ends in the stacking direction, respectively. The fuel cells 10 and the flanges 40*a*, 40*b* are tightened together by a plurality of (e.g., eight) tightening bolts 42. At the center of the fuel cell stack 12, a circular fuel gas supply hole 44 is formed. The fuel gas supply hole 44 has a bottom at the flange 40*a*, and extends in the direction indicated by the arrow A (see FIG. 2).

A plurality of (e.g., four) discharge passages 46 are formed around the fuel gas supply hole 44. Each of the discharge passages 46 has a bottom at the flange 40*b*, and extend from the flange 40*b* in the direction indicated by the arrow A. The flanges 40*a*, 40*b* are insulated from end plates 97*a*, 97*b* by insulator plates 98*a*, 98*b* interposed between the flanges 40*a*, 40*b*, and the end plates 97*a*, 97*b*, respectively. Output terminals 48*a*, 48*b*, extend from the end plates 97*a*, 97*b*, respectively.

Figure 4:
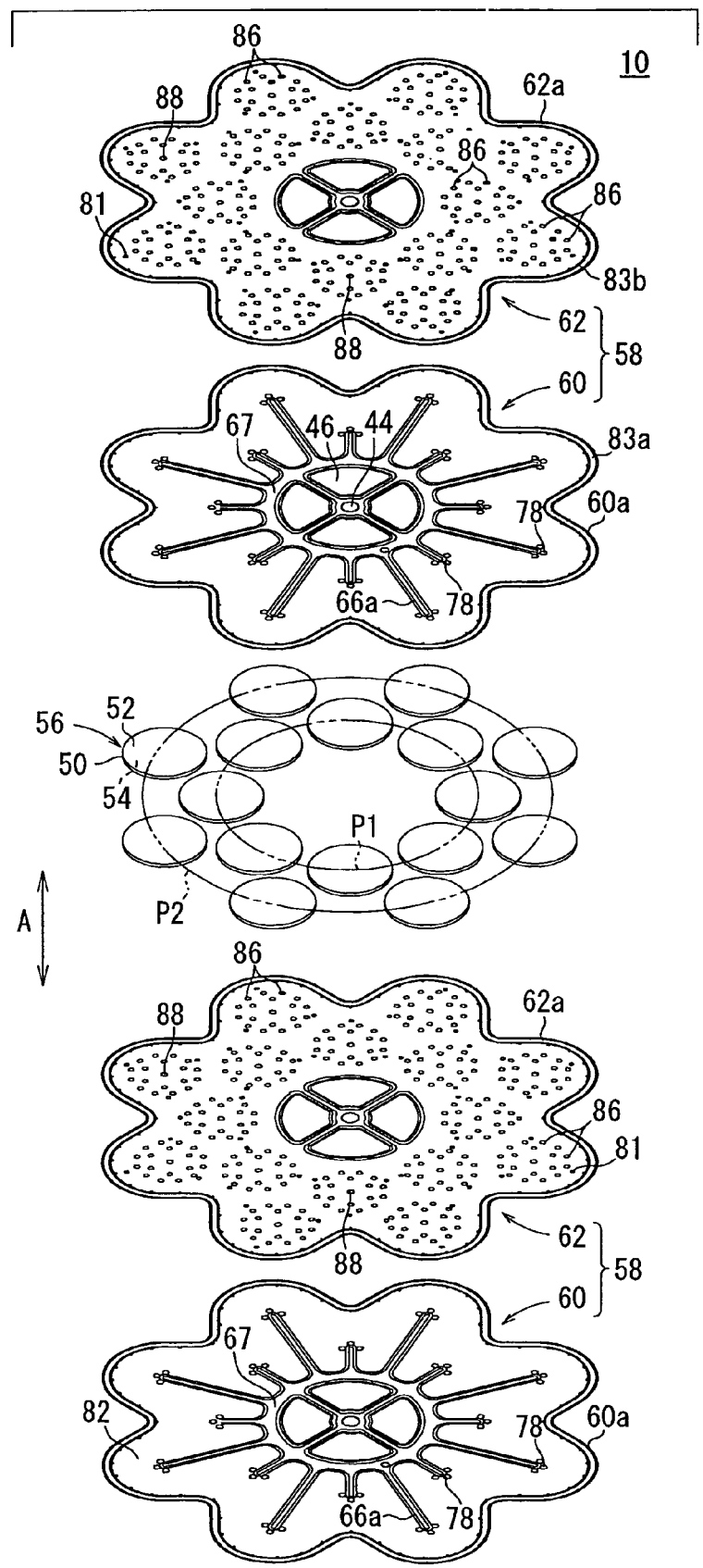
FIG. 4 is an exploded perspective view of the fuel cell.
Figure 5:
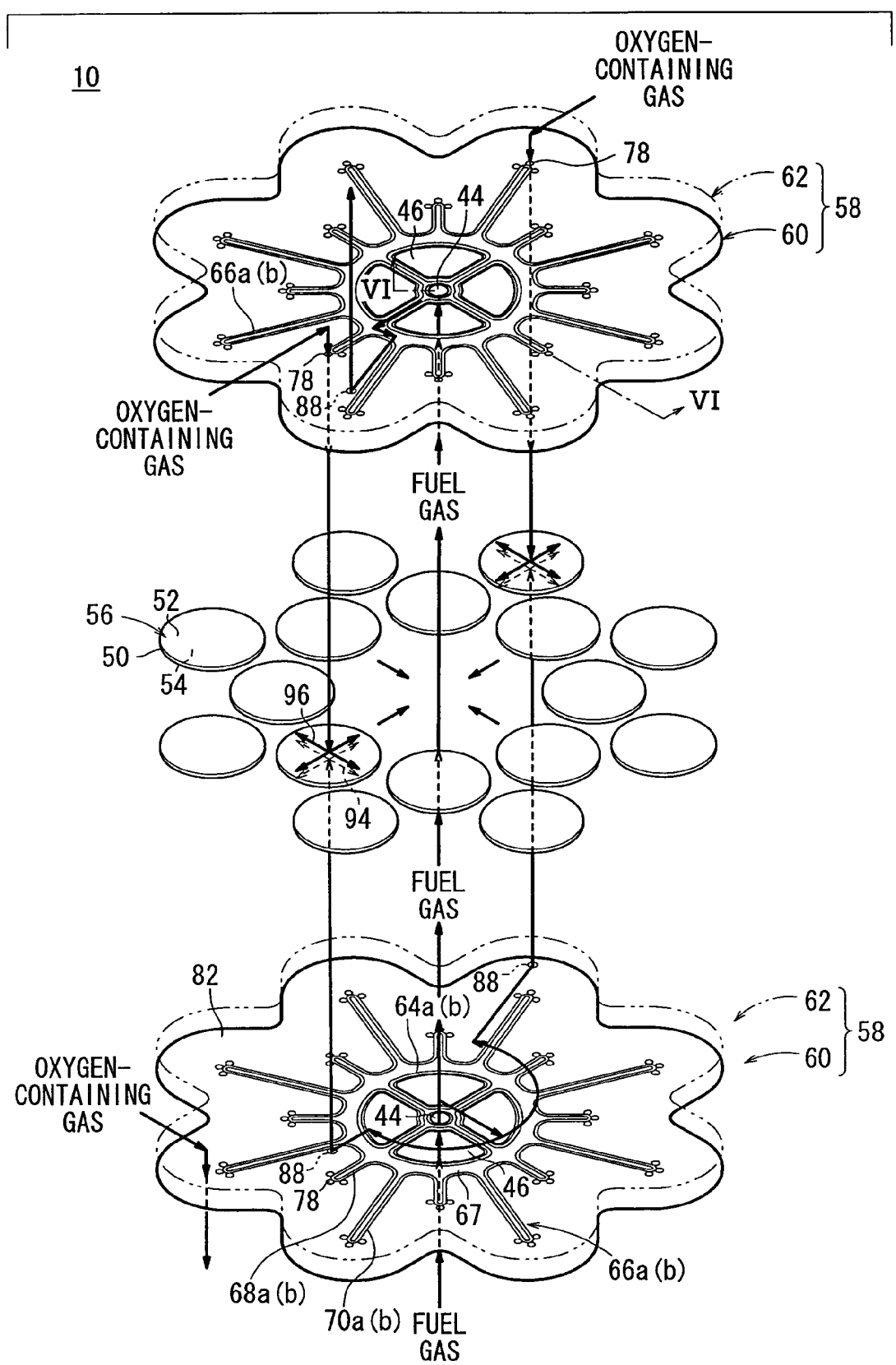
FIG. 5 is a perspective view showing a part of the fuel cell and operation of the fuel cell.

As shown in FIGS. 4 and 5, the fuel cell 10 includes electrolyte electrode assemblies 56. Each of the electrolyte electrode assemblies 56 includes a cathode 52, an anode 54, and an electrolyte (electrolyte plate) 50 interposed between the cathode 52 and the anode 54. The electrolyte 50 is formed of an ion-conductive solid oxide such as stabilized zirconia. The electrolyte electrode assembly 56 has a relatively small circular disk shape.

A plurality of (e.g., 16) the electrolyte electrode assemblies 56 are interposed between a pair of separators 58 to form the fuel cell 10. The electrolyte electrode assemblies 56 are arranged along an inner circle P1 and an outer circle P2 which are concentric with the fuel gas supply hole 44 formed at the center of the separators 58. The inner circle P1 passes through centers of eight inner electrolyte electrode assemblies 56, and the outer circle P2 passes through centers of eight outer electrolyte electrode assemblies 56 (see FIG. 4).

Each of the separators 58 includes a plurality of (e.g., two) plates 60, 62 which are stacked together. Each of the plates 60, 62 is formed of a stainless alloy, for example. Curved outer sections 60*a*, 62*a* are formed on the plates 60, 62, respectively (see FIGS. 7 and 8).

Figure 6:
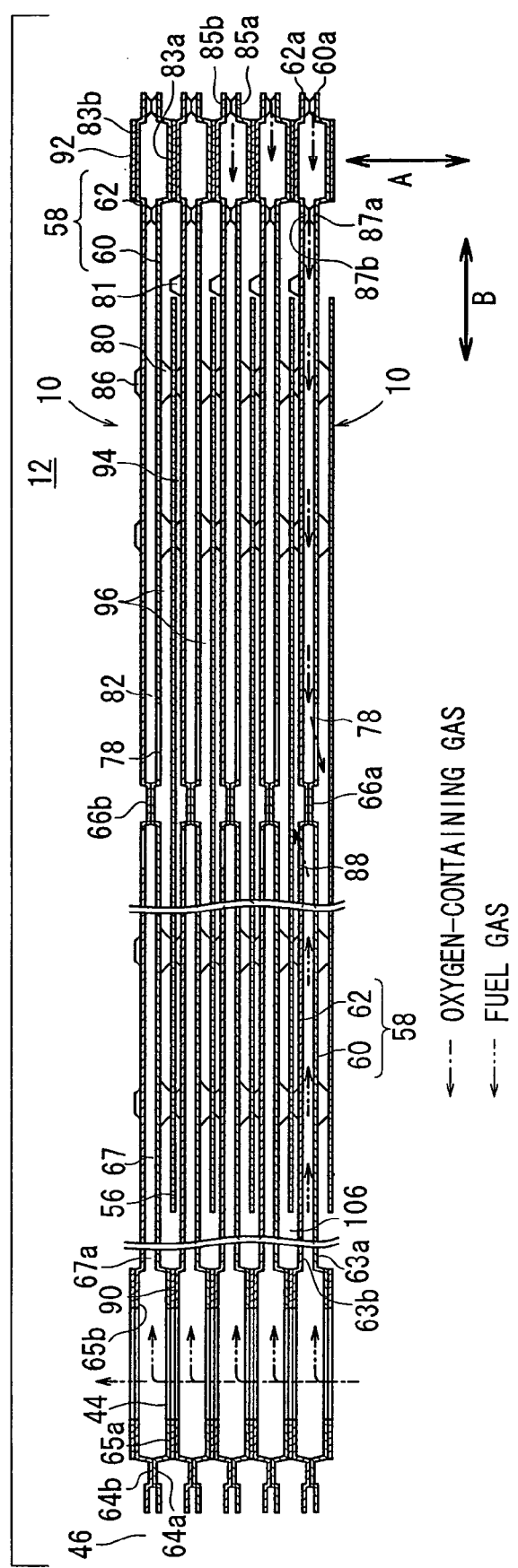
FIG. 6 is a cross sectional view, with partial omissions, showing the fuel cell stack.
Figure 7:
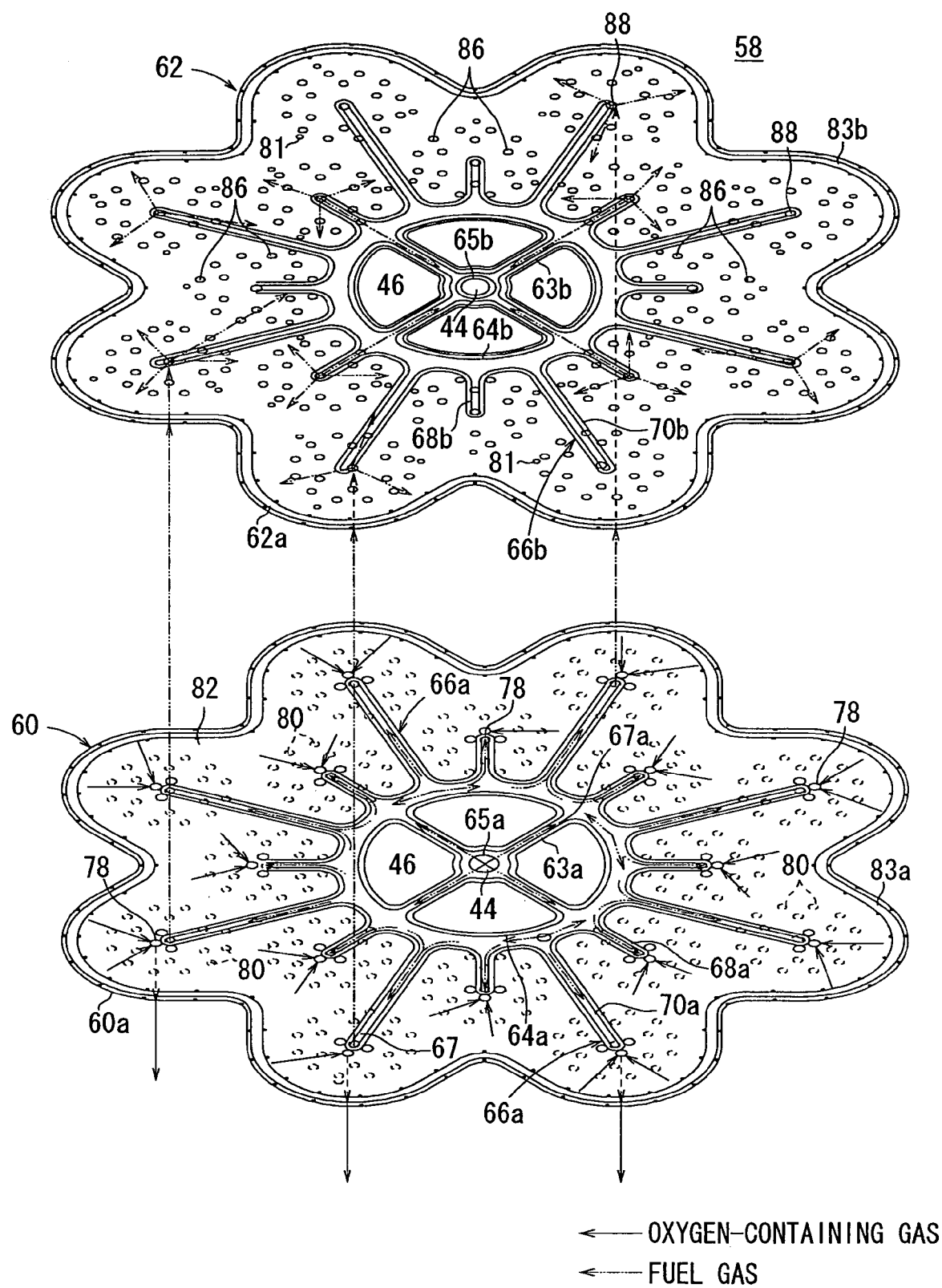
FIG. 7 is an exploded perspective view showing a separator of the fuel cell.
Figure 9:
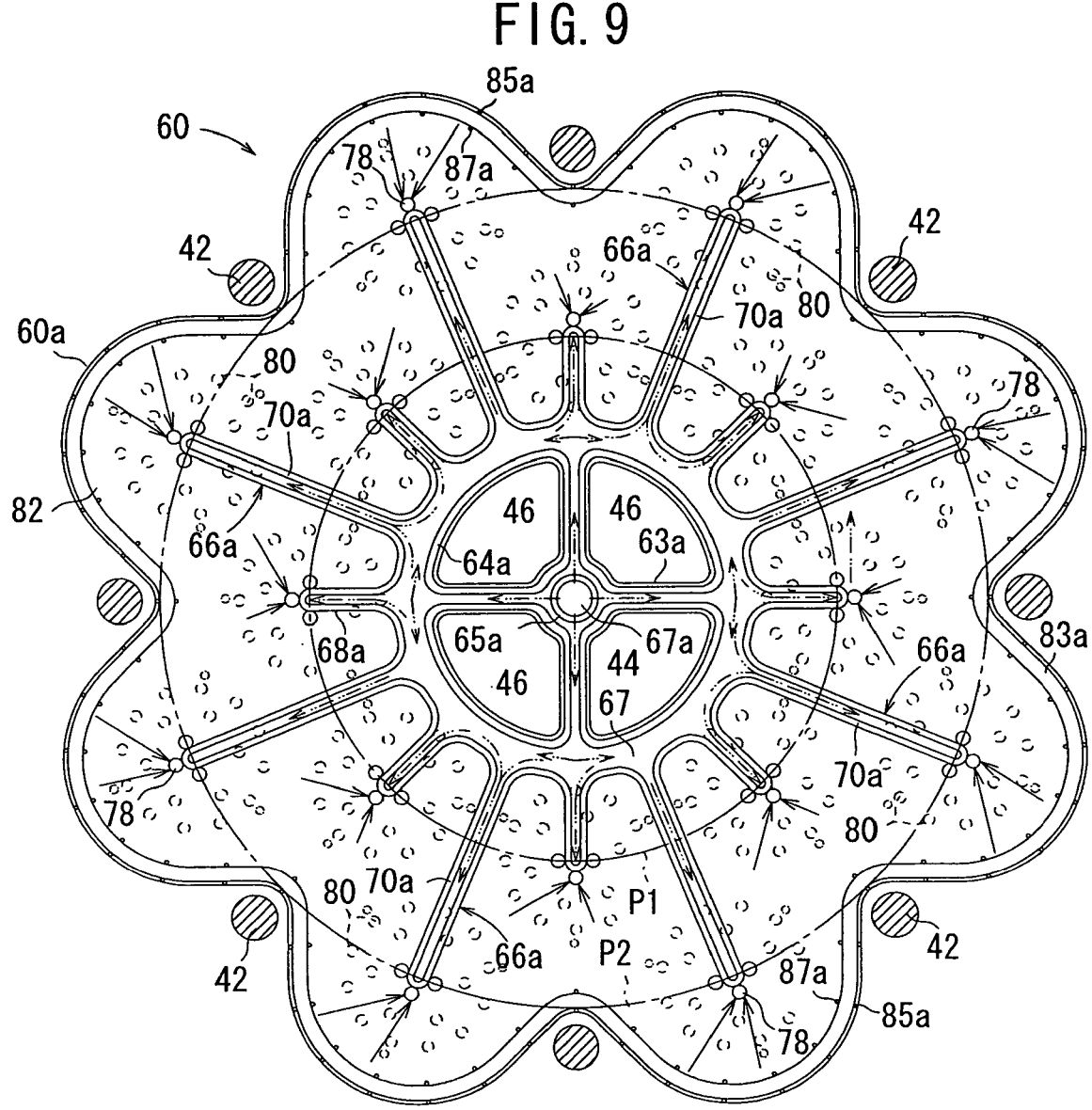
FIG. 9 is a front view showing a plate of the separator.

As shown in FIGS. 6, 7, and 9, ribs 63*a* are provided around the center of the plate (first plate) 60 to form the fuel gas supply hole 44 and the four discharge passages 46. The plate 60 has four inner ridges 64*a* around the respective discharge passages 46. The inner ridges 64*a* protrude toward the plate (second plate) 62. The plate 60 has a protrusion 65*a* around the fuel gas supply hole 44. The protrusion 65*a* protrudes away from the plate 62 in a direction opposite to the inner ridges 64*a*.

An outer ridge 66*a* is formed radially outwardly around the fuel gas supply hole 44 on the plate 60. A fuel gas channel 67 is formed inside the inner ridges 64*a* and the outer ridge 66*a*. The fuel gas channel 67 is connected to the fuel gas supply hole 44 through the fuel gas distribution passages 67*a*. Each of the fuel gas distribution passages 67*a* extends between the discharge passages along a surface of the separator 58, in a direction indicated by an arrow B, i.e., perpendicularly to the stacking direction for connecting the fuel gas supply hole 44 and the fuel gas supply channel 67.

The outer ridge 66*a* includes a plurality of first walls 68*a* and second walls 70*a* each extending radially outwardly by a predetermined distance. The first walls 68*a* and the second walls 70*a* are formed alternately. As shown in FIG. 9, each of the first walls 68*a* extends to an inner circle P1 which is a virtual line passing through centers of eight inner electrolyte electrode assemblies 56. Each of the second walls 70*a* extends to an outer circle P2 which is a virtual line passing through centers of eight outer electrolyte electrode assemblies 56. The eight inner electrolyte electrode assemblies 56 are arranged along the inner circle P1, and the eight outer electrolyte electrode assemblies 56 are arranged along the outer circle P2.

At each end portion of the first walls 68*a* and at each end portion of the second walls 70*a*, three oxygen-containing gas inlets 78 are formed. The oxygen-containing gas inlets 78 are formed to pass through the plate 60. The plate 60 has first bosses 80 protruding toward, and contact the electrolyte electrode assemblies 56 arranged along the inner circle P1 and the outer circle P2.

Figure 8:
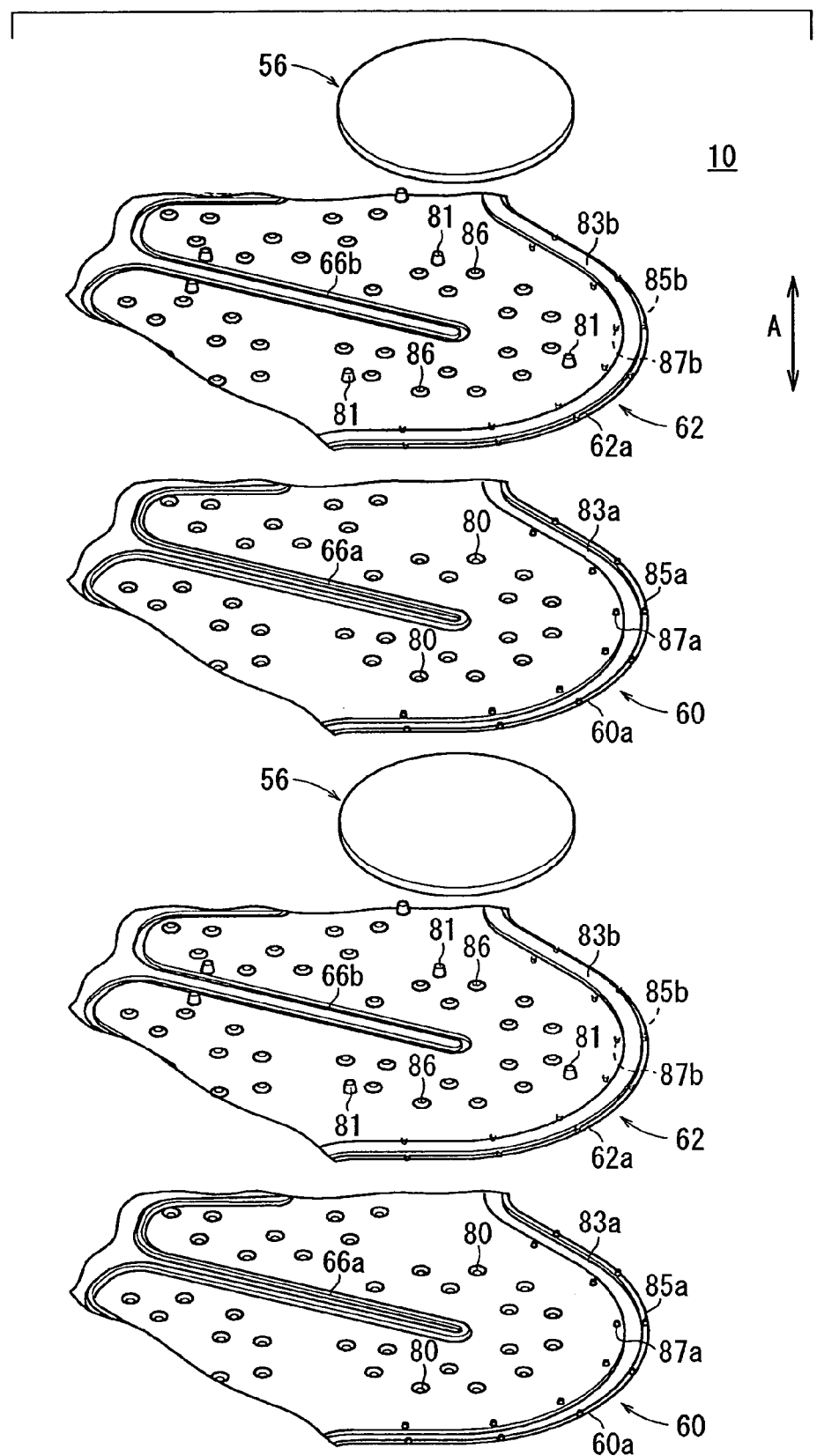
FIG. 8 is an enlarged perspective view showing a part of the fuel cell.

As shown in FIGS. 6, 8, and 9, a first curved circumferential ridge (first ridge) 83*a* is formed on the plate 60 along the curved outer section 60*a*. The first circumferential ridge 83*a* has the shape identical to the curved outer section 60*a*, and protrudes away from the plate 62. Outer projections (first outer projections) 85*a* and inner projections (first inner projections) 87*a* are provided at predetermined intervals on opposite sides of the first circumferential ridge 83*a* to face each other.

Figure 10:
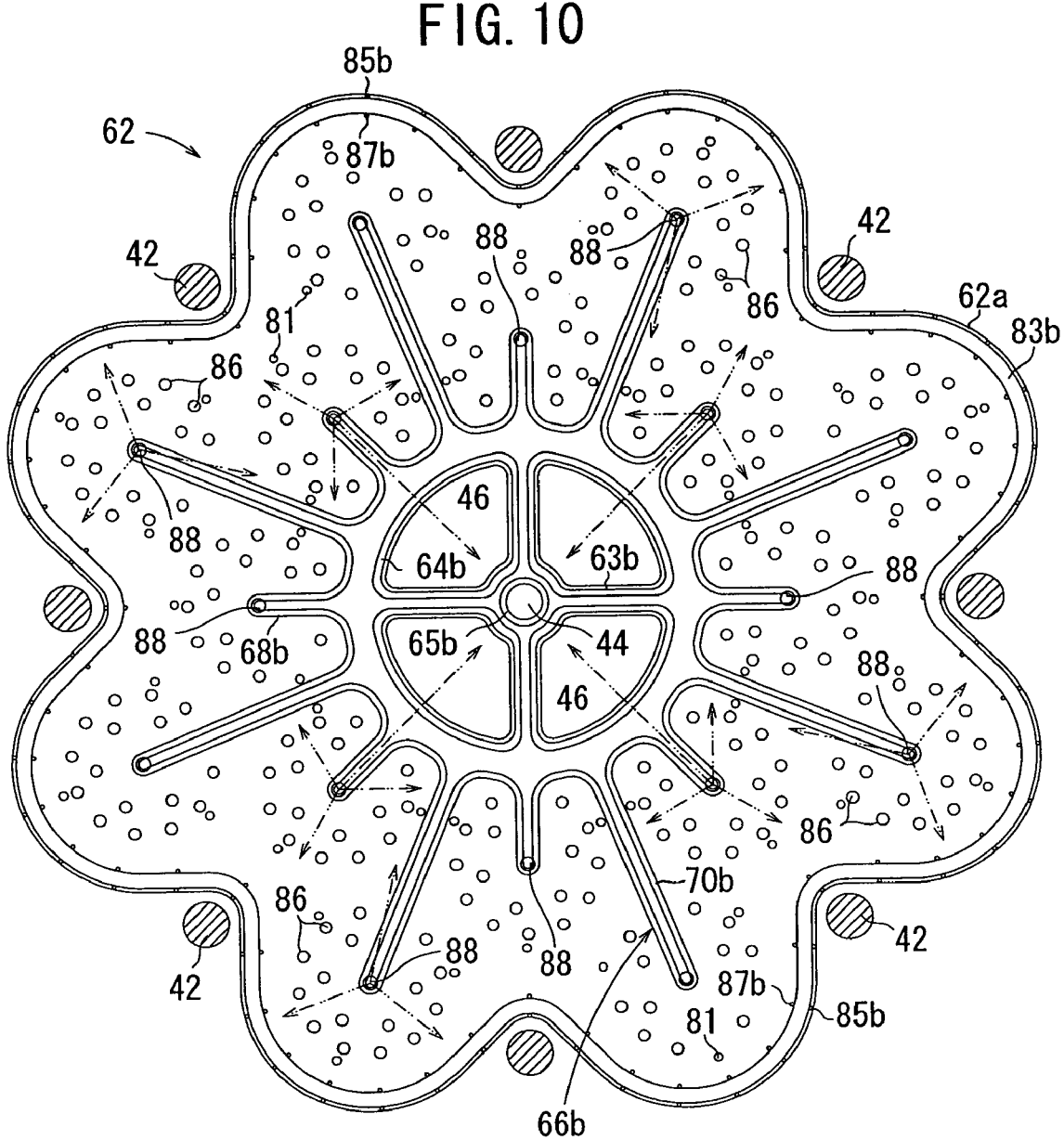
FIG. 10 is a front view showing the other plate of the separator.

As shown in FIGS. 6, 7, and 10, ribs 63*b* facing the ribs 63*a* are provided around the center of the plate 62. The plate 62 has four inner ridges 64*b* protruding toward the plate 60, and a protrusion 65*b* protruding away form the plate 60. When the plates 60, 62 are connected together, a space extending through the protrusions 65*a*, 65*b* protruding away from each other form the fuel gas supply hole 44.

An outer ridge 66*b* protruding toward the outer ridge 66*a* of the plate 60 is formed on the plate 62. The inner ridges 64*a* contact the inner ridges 64*b*, and the outer ridge 66*a* contact the outer ridge 66*b* to form the fuel gas channel 67 between the plate 60 and the plate 62. The fuel gas channel 67 is connected to the fuel gas supply hole 44 through fuel gas distribution passages 67*a*. The outer ridge 66*b* includes a plurality of first walls 68*b* and second walls 70*b* each extending radially outwardly by a predetermined distance. The first walls 68*b* and the second walls 70*b* are formed alternately.

Further, the plate 62 has second bosses 86 protruding toward, and contact the electrolyte electrode assemblies 56 arranged along the inner circle P1 and the outer circle P2. The second bosses 86 have small dimensions (height and diameter) in comparison with the first bosses 80. Fuel gas inlets 88 are formed to pass through the plate 62. The fuel gas inlets 88 are connected to the fuel gas channel 67.

Protrusions 81 for positioning the eight electrolyte electrode assemblies 56 along the inner circle P1 and the eight electrolyte electrode assemblies 56 along the outer circle P2 are provided on the plate 62. At least three protrusions 81 are formed for each of the electrolyte electrode assemblies 56. In the first embodiment, three protrusions 81 are formed for positioning one electrolyte electrode assembly 56, for example. When the electrolyte electrode assembly 56 is positioned inside the protrusions 81, there is some clearance between the protrusions 81 and the electrolyte electrode assembly 56. The height of the protrusions 81 is greater than the height of the second bosses 86 (see FIG. 6).

As shown in FIGS. 6, 8, and 10, a second circumferential ridge (second ridge) 83*b* is formed on the plate 62 along the curved outer section 62*a*. The second circumferential ridge 83*b* has the shape identical to the curved outer section 62*a*, and protrudes away from the plate 60. Outer projections (second outer projections) 85*b* and inner projections (second inner projections) 87*b* are provided at predetermined intervals on opposite sides of the second circumferential ridge 83*b* to face each other.

The fuel gas channel 67 is surrounded by the inner ridges 64*a*, 64*b*, and the outer ridges 66*a*, 66*b* between the plate 60 and the plate 62. An oxygen-containing gas channel 82 is formed outside the outer ridges 66a, 66b between the plate 60 and the plate 62 (see FIG. 11). The oxygen-containing gas channel 82 is connected to the oxygen-containing gas inlets 78 formed on the plate 60.

As shown in FIG. 6, the separator 58 has an insulator seal 90 for sealing the fuel gas supply hole 44. The insulator seal 90 is formed by placing a ceramics plate, or thermal spraying ceramics to the protrusion 65a of the plate 60 or the projection 65b of the plate 62. The first circumferential ridge 83a of the plate 60 and the second circumferential ridge 83b of the plate 62 protrude away from each other, and forms an space between the first circumferential ridge 83a and the second circumferential ridge 83b as a part of the oxygen-containing gas channel 82. An insulator seal 92 formed of ceramics or the like is provided on the first circumferential ridge 83a or the second circumferential ridge 83b by sandwiching the insulator seal 92 between the first circumferential ridge 83a and the second circumferential ridge 83b or by thermal spraying.

As shown in FIGS. 5 and 6, the electrolyte electrode assemblies 56 are interposed between the plate 60 of one separator 58 and the plate 62 of the other separator 58. Specifically, the plate 60 and the plate 62 outside the electrolyte electrode assemblies 56 has the first bosses 80 and the second bosses 86 protruding toward the electrolyte electrode assemblies 56 for sandwiching the electrolyte electrode assemblies 56.

Figure 11:
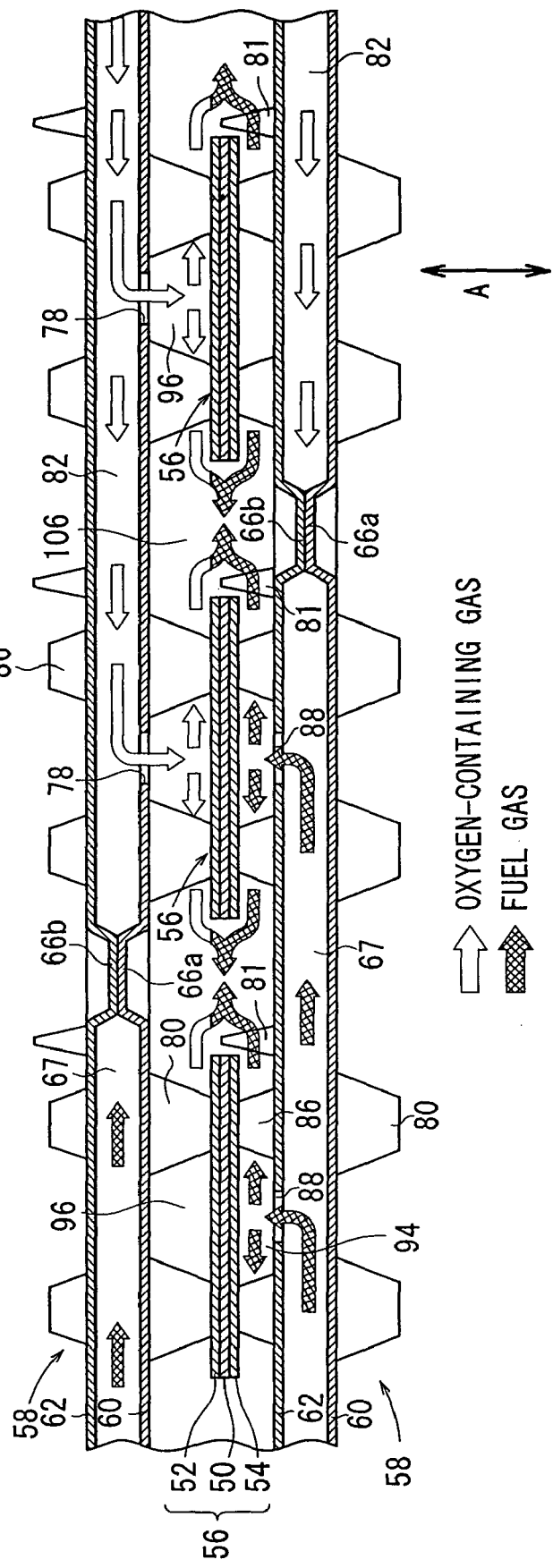
FIG. 11 is a view showing operation of the fuel cell.

As shown in FIG. 11, a fuel gas flow passage 94 connected to the fuel gas channel 67 through the fuel gas inlets 88 is formed between the electrolyte electrode assemblies 56 and the plate 62 of the separator 58. Further, an oxygen-containing gas flow passage 96 connected to the oxygen-containing gas channel 82 through the oxygen-containing gas inlets 78 is formed between the electrolyte electrode assemblies 56 and the plate 60 of the other separator 58 on the opposite side. The size of the opening of the fuel gas flow passage 94 depends on the height of the second bosses 86. The size of the opening of the oxygen-containing gas flow passage 96 depends on the height of the first bosses 80. The flow rate of the fuel gas is smaller than the flow rate of the oxygen-containing gas. Therefore, the dimensions of the second bosses 86 are smaller than the dimensions of the first bosses 80.

As shown in FIG. 6, the fuel gas channel 67 is connected to the fuel gas supply hole 44 extending through the protrusions 65a, 65b of the separator 58. The oxygen-containing gas channel 82 and the fuel gas channel 67 are formed on the same area inside the separator 58. The oxygen-containing gas channel 82 is open to the outside through the spacing between the first and second circumferential ridges 83a, 83b of the plates 60, 62 of the separator 58.

Each of the separators 58 stacked in the stacking direction has the first bosses 80 and the second bosses 86 for sandwiching the electrolyte electrode assemblies 56. The first bosses 80 and the second bosses 86 function as current collectors. The outer ridge 66a of the plate 60 is in contact with the outer ridge 66b of the plate 62, and the inner ridges 64a of the plate 60 is in contact with the inner ridges 64b of the plate 62 for serially connecting the fuel cells 10 in the direction indicated by the arrow A.

As shown in FIGS. 1 and 2, the fuel cells 10 are stacked in the direction indicated by the arrow A. End plates 97a, 97b are stacked on the outermost fuel cells 10 at opposite ends. Insulator plates 98a, 98b are stacked on the outside of the end plates 97a, 97b, respectively, and flanges 40a, 40b are stacked on the outside of the insulator plates 98a, 98b, respectively. The flanges 40a, 40b have holes 100a, 100b at positions corresponding to the inward curves of the curved outer sections 60a, 62a of the plates 60, 62. Tightening bolts 42 are inserted in the holes 100a, 100b. Ends of the tightening bolts 42 are screwed into nuts 104 for tightening the fuel cells 10 together with a suitable force.

Next, operation of the fuel cell stack 12 will be described below.

In assembling the fuel cell 10, the plate 60 and the plate 62 are connected together to form the separator 58. Specifically, as shown in FIG. 6, the outer ridge 66a and the inner ridges 64a of the plate 60 are connected to the outer ridge 66b and the inner ridges 64b of the plate 62 by brazing, and the ring-shaped insulator seals 90 are provided on the plate 60 or the plate 62 around the fuel gas supply hole 44 by thermal spraying, for example. Further, the insulator seal 92 having curves is provided on the first circumferential edge 83a of the plate 60 or the second circumferential edge 83b of the plate 62 by thermal spraying, for example.

The separator 58 thus formed has the fuel gas channel 67 and the oxygen-containing gas channel 82 on the same area between the plate 60 and the plate 62. The fuel gas channel 67 is connected to the fuel gas supply hole 44 through the fuel gas distribution passages 67a, and the oxygen-containing gas channel 82 between the curved outer section 60a and the curved outer section 62a is open to the outside.

Then, the electrolyte electrode assemblies 56 are interposed between a pair of separators 58. As shown in FIGS. 4 and 5, sixteen electrolyte electrode assemblies 56 are interposed between the plate 60 of one separator 58 and the plate 62 of the other separator 58. Eight electrolyte electrode assemblies 56 are arranged along the inner circle P1, and eight electrolyte electrode assemblies 56 are arranged along the outer circle P2.

Three protrusions 81 are provided for positioning each of the electrolyte electrode assemblies 56. The electrolyte electrode assembly 56 is placed inside the three protrusions 81. The first bosses 80 of the plate 60 and the second bosses 86 of the plate 62 protrude toward, and contact the electrolyte electrode assembly 56 inside the protrusions 81.

As shown in FIG. 11, the oxygen-containing gas flow passage 96 is formed between the cathodes 52 of the electrolyte electrode assemblies 56 and the plate 60. The oxygen-containing gas flow passage 96 is connected to the oxygen-containing gas channel 82 through the oxygen-containing gas inlets 78. The fuel gas flow passage 94 is formed between the anodes 54 of the electrolyte electrode assemblies 56 and the plate 62. The fuel gas flow passage 94 is connected to the fuel gas channel 67 through the fuel gas inlets 88. An exhaust gas channel 106 is formed between the separators 58 for guiding the exhaust gas (mixed gas of the fuel gas and the oxygen-containing gas after reaction) to the discharge passages 46.

A plurality of the fuel cells 10 as assembled above are stacked in the direction indicated by the arrow A to form the fuel cell stack 12 (see FIGS. 1 and 2).

The fuel gas such as a hydrogen-containing gas is supplied to the fuel gas supply hole 44 of the flange 40b, and the oxygen-containing gas such as air is supplied from the outside of the fuel cells 10 under pressure. The fuel gas supplied to the fuel gas supply hole 44 flows in the stacking direction indicated by the arrow A, and is supplied to the fuel gas distribution passages 67a formed in each of the separators 58 of the fuel cells 10 (see FIG. 6).

As shown in FIG. 5, the fuel gas flows through the fuel gas channel 67 along the first walls 68a, 68b and the second walls 70a, 70b of the outer ridges 66a, 66b. The fuel gas flows into the fuel gas flow passage 94 through the fuel gas inlets 88 formed at end portions of the first walls 68a, 68b and the second walls 70a, 70b, i.e., at positions corresponding to central regions of the anodes 54 of the electrolyte electrode assemblies 56. The fuel gas supplied to the fuel gas flow passage 94 flows outwardly from the central regions of the anodes 54 (see FIG. 11).

The oxygen-containing gas is supplied to each of the fuel cells 10 from the outside. The oxygen-containing gas is supplied to the oxygen-containing gas channel 82 formed in each of the separators 58, between the plate 60 and the plate 62. The oxygen-containing gas supplied to the oxygen-containing gas channel 82 flows into the oxygen-containing gas flow passage 96 from the oxygen-containing gas inlets 78, and flows outwardly from central regions of the cathodes 52 of the electrolyte electrode assemblies 56 (see FIGS. 5 and 11).

Therefore, in each of the electrolyte electrode assemblies 56, the fuel gas is supplied to the central region of the anode 54, and flows outwardly from the central region of the anode 54. Similarly, the oxygen-containing gas is supplied to the central region of the cathode 52, and flows outwardly from the central region of the cathode 52. The oxygen-ion passes from the cathode 52 to the anode 54 through the electrolyte 50 to generate electricity by electrochemical reactions.

The electrolyte electrode assemblies 56 are sandwiched between the first bosses 80 and the second bosses 86. Therefore, the first bosses 80 and the second bosses 86 function as current collectors. The fuel cells 10 are electrically connected in series in the stacking direction indicated by the arrow A. The electricity can be outputted from the output terminals 48a, 48b. Even if some of the electrolyte electrode assemblies 56 have power failures, the fuel cell stack 12 can be energized by the other electrolyte electrode assemblies 56. Therefore, the power generation can be performed reliably.

After reaction of the fuel gas and the oxygen-containing gas, the exhaust gas moves outwardly from the central regions of the electrolyte electrode assemblies 56 through the exhaust gas channel 106 between the separators 58, and flows toward the center of the separators 58. The exhaust gas flows into the four discharge passages 46 formed near the center of separators 58 as an exhaust gas manifold, and is discharged from the discharge passages 46 to the outside.

In the first embodiment, a plurality of (e.g., 16) circular electrolyte electrode assemblies 56 having a relatively small diameter are provided between a pair of separators 58. Thus, the electrolyte electrode assemblies 56 can be thin, and the resistance polarization is reduced. Further, temperature distribution is small, and damages due to heat stress are prevented. Therefore, the power generation performance of the fuel cells 10 is effectively improved.

Further, the eight inner electrolyte electrode assemblies 56 are arranged along the inner circle P1, and the eight outer electrolyte electrode assemblies 56 are arranged along the outer circle P2. The inner circle P1 and the outer circle P2 are concentric with the fuel gas supply hole 44 positioned at the center of the separators 58. The eight outer eight electrolyte electrode assemblies 56 are positioned out of radial alignment with the eight inner electrolyte electrode assemblies 56. Stated otherwise, the inner electrolyte electrode assemblies 56 and the outer electrolyte electrode assemblies 56 are arranged alternately along the inner circle P1 and the outer circle P2, respectively.

The electrolyte electrode assemblies 56 can be arranged between the separators 58 densely. Thus, the overall fuel cell 10 can be made compact, while maintaining the desired power generation performance.

In the first embodiment, as shown in FIG. 6, the first circumferential ridge 83a is formed on the curved outer section 60a of the plate 60 of the separator 58, and the second circumferential ridge 83b is formed on the curved outer section 62a of the plate 62 of the separator 58. The first circumferential ridge 83a and the second circumferential ridge 83b protrude away from each other to form a space between the first circumferential ridge 83a and the second circumferential ridge 83b as the oxygen-containing gas channel 82. The plate 60 includes the outer projections 85a and the inner projections 87a on opposite sides of the first circumferential ridge 83a. The plate 62 includes the outer projections 85b and the inner projections 87b on opposite sides of the second circumferential ridge 83b.

The outer projections 85a and the outer projection 85b are in contact with each other, and the inner projections 87a and the inner projections 87b are in contact with each other. Therefore, the rigidity of the first circumferential ridge 83a and the second circumferential ridge 83b is good.

Thus, when the fuel cells 10 are stacked in the direction indicated by the arrow A, and the separators 58 are tightened in the stacking direction of the fuel cells 10 with the bolts 42 as shown in FIG. 1, the pressure is uniformly applied to the surfaces of the separators 58, and the shape of the space between the first circumferential ridge 83a and the second circumferential ridge 83b is maintained.

Since the space between the first circumferential ridge 83a and the second circumferential ridge 83b as a part of the oxygen-containing gas channel 82 is not deformed, it is possible to supply the oxygen-containing gas to each of the electrolyte electrode assemblies 56 uniformly, and achieve the desired power generation performance of the fuel cell 10. Further, since the first circumferential ridge 83a and the second circumferential ridge 83b are not deformed, the sealing characteristics in the separator 58 are improved effectively.

Since the first circumferential ridge 83a and the second circumferential ridge 83b are formed around the entire curved outer sections 60a, 62a, respectively. Therefore, the leakage of the oxygen-containing gas does not occur. The rigidity of the plates 60, 62 are improved effectively. Therefore, sealing characteristics of the plates 60, 62 are maintained reliably.

The first circumferential ridge 83a formed on one separator 58 is in contact with the second circumferential ridge 83b formed on the adjacent separator 58 to form the exhaust gas channel 106 connected to the discharge passages 46. The exhaust gas channel 106 has an end (outer circumferential region) closed by first circumferential ridge 83a and the second circumferential ridge 83b. The oxygen-containing gas channel 82 and the exhaust gas channel 106 are formed only by the plates 60, 62 of the separators 58. Thus, the production of the fuel cell 10 is simply performed. Since dedicated pipes or the like are not needed for the oxygen-containing gas channel 82 and the exhaust gas channel 106, the number of components of the fuel cell 10 is small, and the number of steps for forming the plates 60, 62 can be reduced.

Further, since a space is formed between the first circumferential ridge 83a and the second circumferential ridge 83b, the heights of the first circumferential ridge 83a and the second circumferential ridge 83b can be small. Stated otherwise, when the plates 60, 62 are formed under pressure, the amount of drawing for each of the first circumferential ridge 83a, the second circumferential ridge 83b, the outer projections 85a, 85b, and the inner projections 87a, 87b is small. Therefore, the plates 60, 62 can be formed with a high degree of accuracy.

Since the outer projections 85a, 85b, and the inner projections 87a, 87b are connected by brazing for example, these components can be electrically connected to form an electrical circuit.

Figure 12:
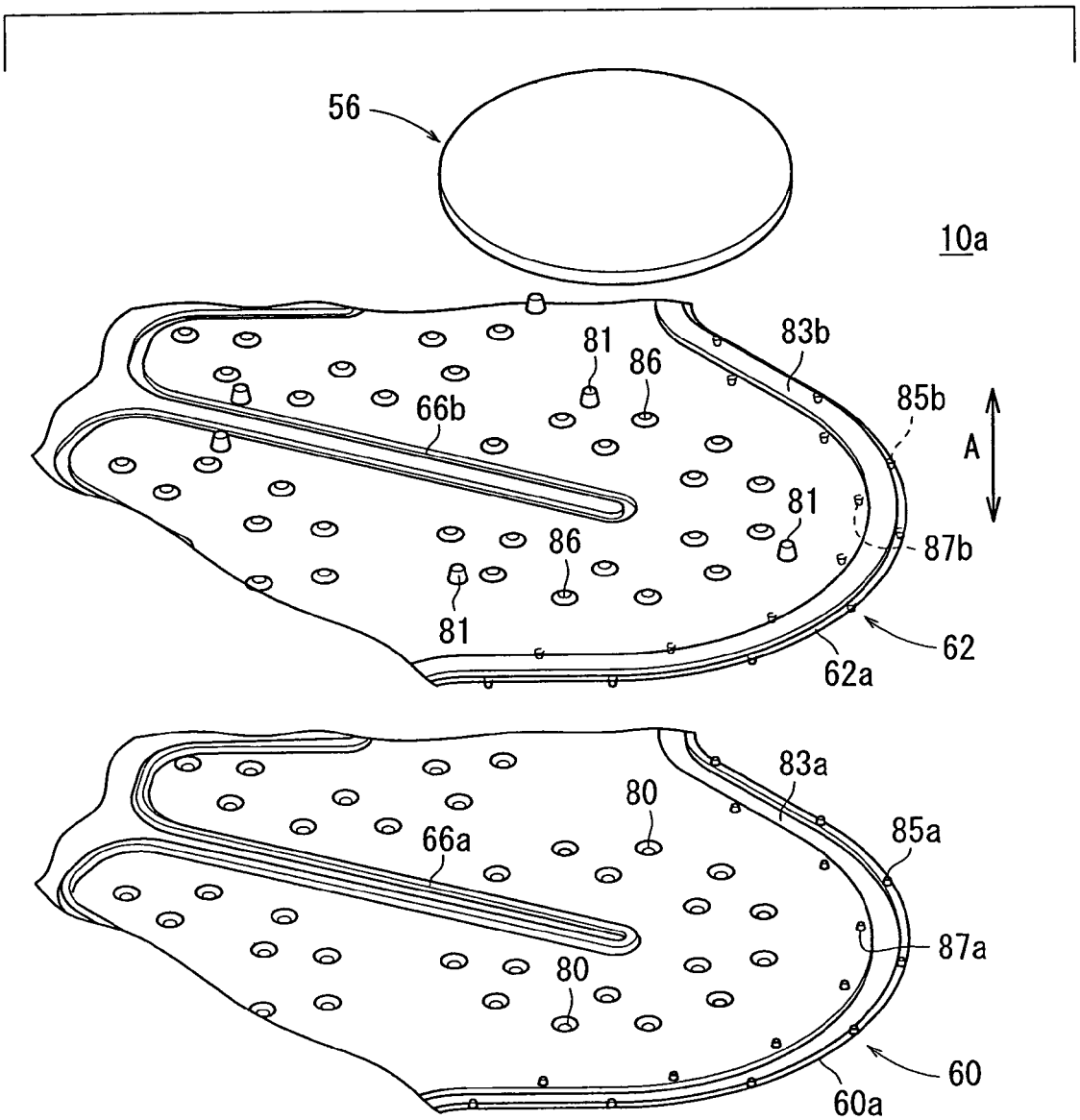
FIG. 12 is an enlarged perspective view showing a part of the fuel cell in which positions of first and second outer projections and first and second inner projections are changed.

In the first embodiment, the outer projections 85a, 85b, and the inner projections 87a, 87b are arranged on opposite sides of the first and second circumferential ridges 83a, 83b to face each other, respectively. However, other arrangements of the outer projections 85a, 85b, and the inner projections 87a, 87b can be adopted. For example, in a fuel cell 10a shown in FIG. 12, the outer projections 85a, 85b, and the inner projections 87a, 87b are arranged on opposite sides of the first and second circumferential ridges 83a, 83b in a zigzag pattern.

Next, the operation of the fuel cell stack 12 used in the gas turbine 14 shown in FIG. 3 will be described briefly.

As shown in FIG. 3, in starting the operation of the gas turbine 14, the combustor 18 is energized to spin the turbine 24, and energize the compressor 26 and the power generator 28. The compressor 26 functions to guide the external air into the supply passage 34. The air is pressurized and heated to a predetermined temperature (e.g., 200° C.), and supplied to the second passage 36 of the heat exchanger 22.

A hot exhaust gas as a mixed gas of the fuel gas and the oxygen-containing gas after reaction is supplied to the first passage 32 of the heat exchanger 22 for heating the air supplied to the second passage 36 of the heat exchanger 22. The heated air flows through the hot air supply passage 38, and supplied to the fuel cells 10 of the fuel cell stack 12 from the outside. Thus, the power generation is performed by the fuel cells 10, and the exhaust gas generated by the reaction of the fuel gas and the oxygen-containing gas is discharged into the chamber 20 in the casing 16.

At this time, the temperature of the exhaust gas discharged from the fuel cells (solid oxide fuel cells) 10 is high, in the range of 800° C. to 1000° C. The exhaust gas spins the turbine 24 for generating electricity by the power generator 28. The exhaust air is supplied to the heat exchanger 22 for heating the external air. Therefore, it is not necessary to use the combustor 18 for spinning the turbine 24.

The hot exhaust gas in the range of 800° C. to 1000° C. can be used for internally reforming a fuel supplied to the fuel cell stack 12. Therefore, various fuels such as natural gas, butane, and gasoline can be used for the internal reforming.

Figure 13:
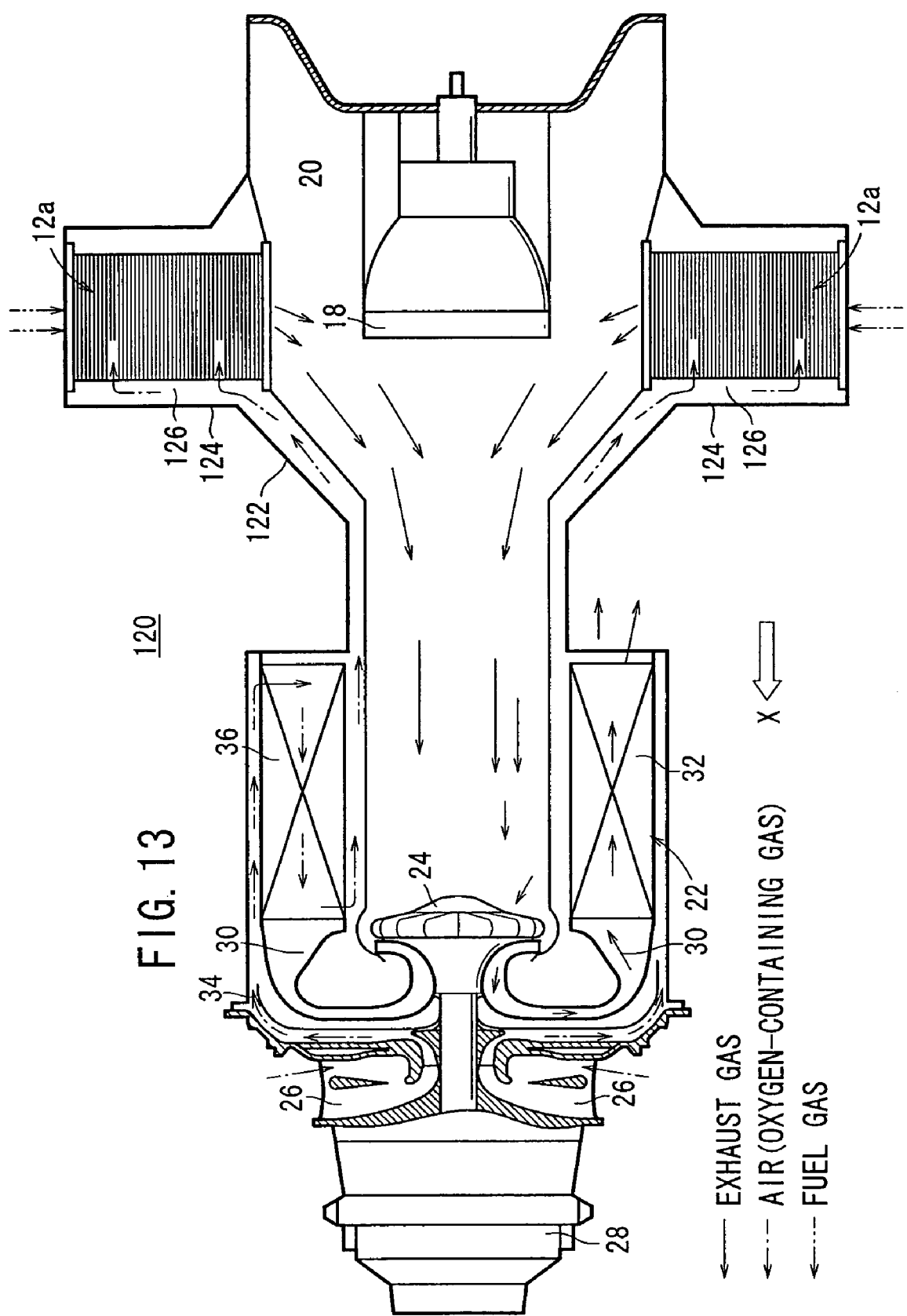
FIG. 13 is a cross sectional view schematically showing a gas turbine including relatively small fuel cell stacks according to a second embodiment of the present invention.
Figure 14:
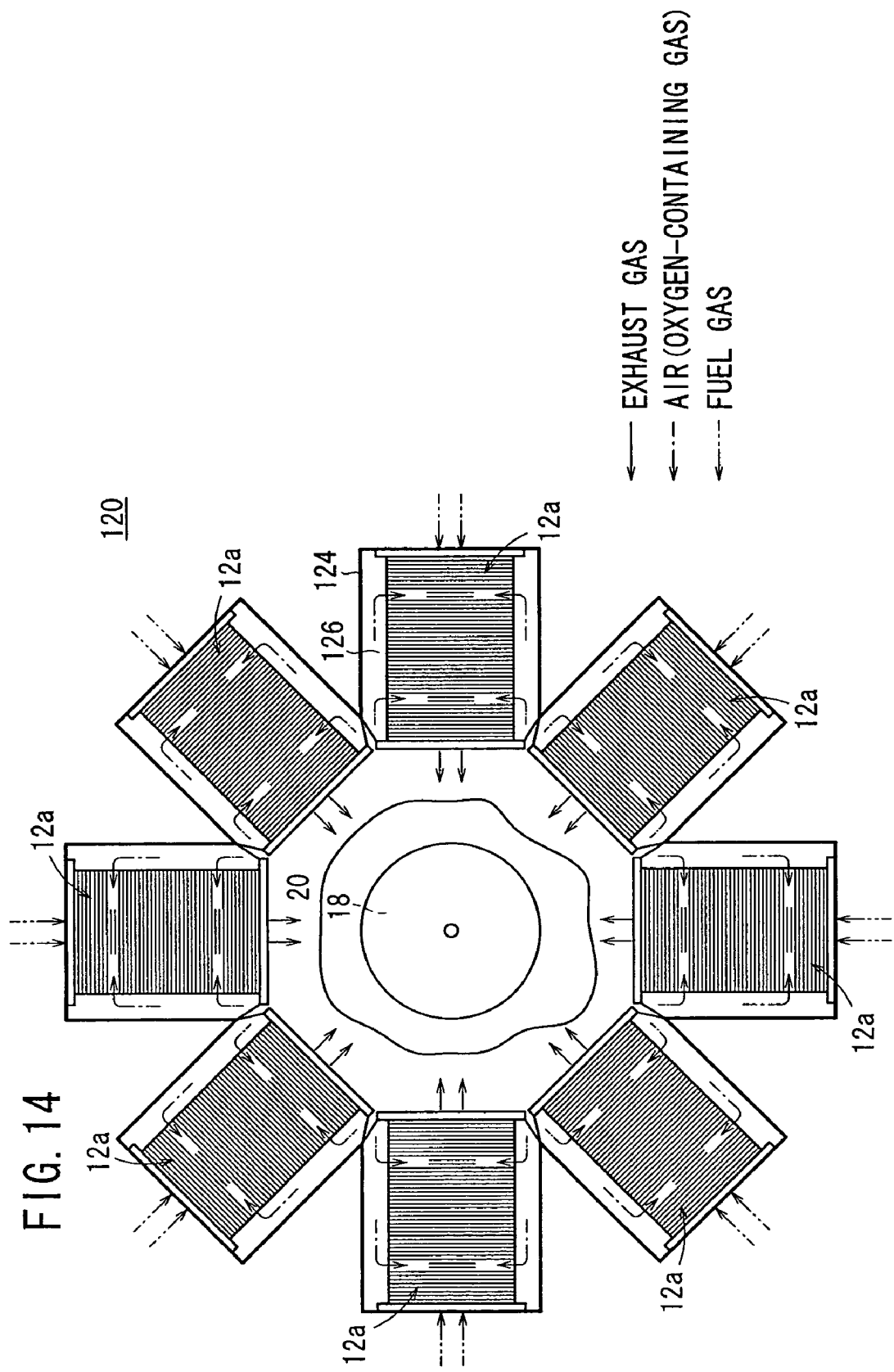
FIG. 14 is a front view showing the gas turbine.

FIG. 13 is a cross sectional view schematically showing a gas turbine 120 including relatively small fuel cell stacks 12a according to a second embodiment of the present invention, and FIG. 14 is a front view showing the gas turbine 120. The constituent elements that are identical to those of the gas turbine 14 according to the first embodiment are labeled with the same reference numeral, and description thereof is omitted. Similarly, in a third embodiment as described later, the constituent elements that are identical to those of the gas turbine 14 according to the first embodiment are labeled with the same reference numeral, and description thereof is omitted.

In a casing 122 of the gas turbine 120, eight fuel cell stacks 12a are provided around a combustor 18 at intervals of 45°. Each of the fuel cell stacks 12a is covered by a cover 124, and a hot air supply passage 126 is formed inside the cover 124.

As described above, in the casing 122 of the gas turbine 120, eight fuel cell stacks 12a are provided around the combustor 18 at intervals of 45°. Thus, a large electromotive force is generated while the overall length of the gas turbine 120 is short.

Figure 15:
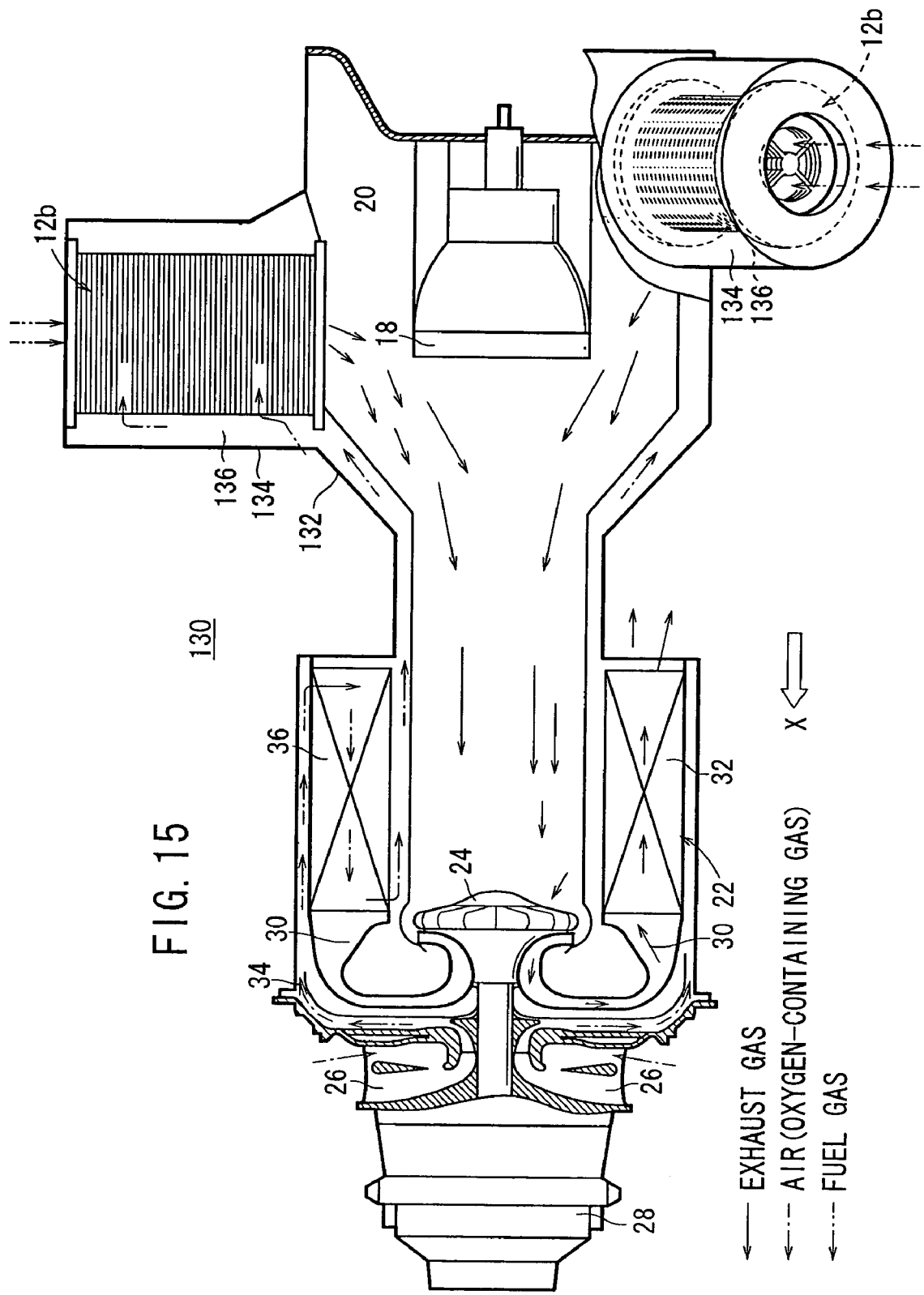
FIG. 15 is a cross sectional view schematically showing a gas turbine including relatively large fuel cell stacks according to a third embodiment of the present invention.
Figure 16:
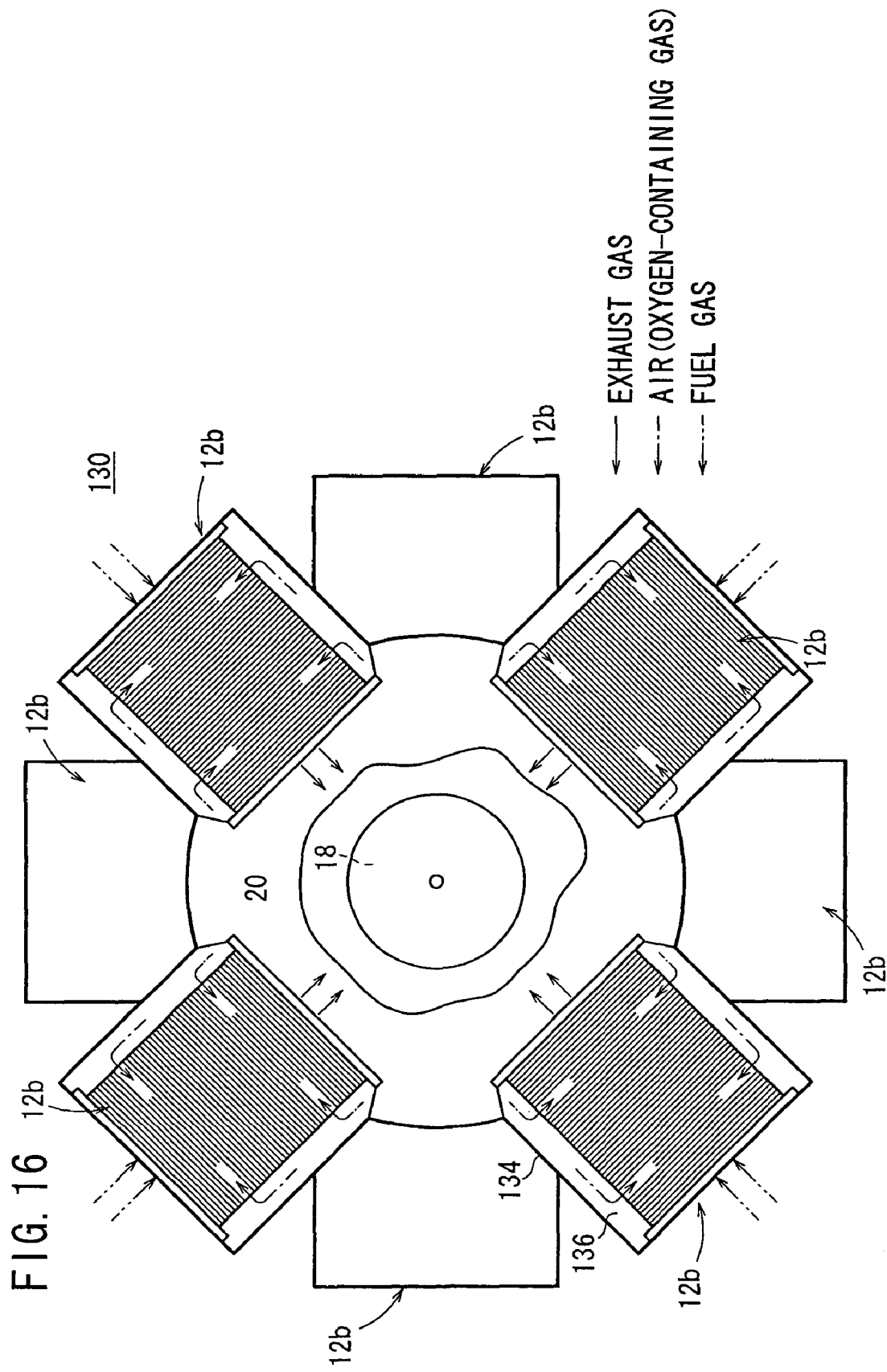
FIG. 16 is a front view showing the gas turbine.
Figure 17:
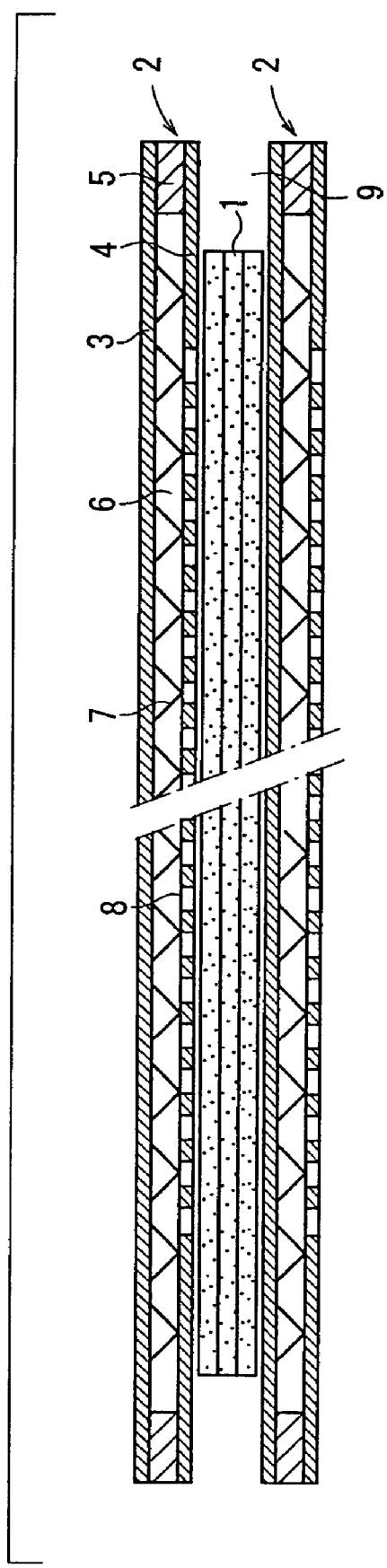
FIG. 17 is an exploded perspective view showing a conventional fuel cell (prior art 2).

FIG. 15 is a cross sectional view schematically showing a gas turbine 130 including relatively large fuel cell stacks 12b according the third embodiment of the present invention, and FIG. 16 is a front view showing the gas turbine 130.

In the gas turbine 130, four fuel cell stacks 12b are arranged along a first circle in the casing 132 at intervals of 90° and four fuel cell stacks 12b are arranged along a second circle in the casing 132 at intervals of 90°. The first circle is spaced from the second circle at a predetermined distance in an axial direction of the casing 132 indicated by an arrow X. Orientation of the four fuel cell stacks 12b arranged along the first circle is shifted by 45° from the second fuel cell stacks 12b arranged along the second circle. Therefore, the fuel cell stacks 12b do not contact with each other. Each of the fuel cell stacks 12b is covered by a cover 134, and a hot air supply passage 136 is formed inside the cover 134.

In the gas turbine 130, the four fuel cells stacks 12b are disposed at intervals of 90° along the first circle, and the additional four fuel cell stacks 12b are disposed at intervals of 90° along the second circle. The orientation of the fuel cell stacks 12b along the first circle is shifted by 45° form the fuel cell stacks 12b arranged along the second circle. Thus, a large number of (eight) fuel cell stacks 12b having a relatively large size can be placed in the gas turbine 130 for improving the power generation efficiency. The outer circumferential dimension of the gas turbine 130 is not large, and the gas turbine 130 is compact.

In the first through third embodiments, the fuel cell stacks 12, 12a, 12b are used in the gas turbines 14, 120, and 130. However, the fuel cell stacks 12, 12a, 12b can be used in other applications. For example, the fuel cell stacks 12, 12a, 12b can be mounted on vehicles.

According to the fuel cell of the present invention, the first outer projection and the second outer projection are in contact with each other, and the first inner projection and the second inner projection are in contact with each other around an space of the oxygen-containing gas channel. Therefore, the rigidity of the fuel cell around the space of the oxygen-containing gas channel is good. When the separators are tightened in the stacking direction of the fuel cells, the pressure is uniformly applied to the surfaces of the electrodes, and the space of the oxygen-containing gas channel is not deformed. It is possible to supply the oxygen-containing gas to each of the electrolyte electrode assemblies uniformly, and achieve the desired power generation performance of the fuel cell. Further, the sealing characteristics between the first plate and the second plate are improved effectively.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising a pair of separators and electrolyte electrode assemblies interposed between said separators, said electrolyte electrode assemblies each including an anode, a cathode, and an electrolyte interposed between said anode and said cathode, wherein each of said separators includes a first plate and a second plate stacked together;

said electrolyte electrode assemblies are interposed between one of said separators having said first and second plates and the other of separators having said first and second plates;

a fuel gas channel for supplying a fuel gas to said anode, and an oxygen-containing gas channel for supplying an oxygen-containing gas to said cathode are formed between said first and second plates which are jointed together;

a first ridge is formed on said first plate, and a second ridge is formed on said second plate, and said first ridge and said second ridge protrude away from each other to form said oxygen-containing gas channel between said first ridge and said second ridge;

said first plate includes a first outer projection and a first inner projection on opposite sides of said first ridge;

said second plate includes a second outer projection and a second inner projection on opposite sides of said second ridge; and said first outer projection and said first inner projection protrude oppositely to said first ridge, and said second inner projection and said second outer projection protrude oppositely to said second ridge such that said first outer projection and said second outer projection are in contact with each other, and said first inner projection and said second inner projection are in contact with each other.

2. A fuel cell according to claim 1, wherein
said first ridge is formed integrally with said first plate, and extends round a curved outer section of said first plate;

said second ridge is formed integrally with said second plate, and extends around a curved outer section of said second plate;

said first outer projection and said first inner projection are formed integrally with said first plate; and said second outer projection and said second inner projection are formed integrally with said second plate.

3. A fuel cell according to claim 2, wherein said first ridge formed on said first plate of said one of said separators is in contact with said second ridge formed on said second plate of the other of said separators to form an exhaust gas channel having an end closed between said separators.

4. A fuel cell according to claim 1, wherein a seal for sealing said oxygen-containing gas channel is formed between said first ridge formed on said first plate of said one of said separators and said second ridge formed on said second plate of the other of said separators.

5. A fuel cell according to claim 1, wherein said electrolyte electrode assemblies are arranged along at least one circle concentric with a central axis of said separators.

* * * * *